United States Patent Office 3,476,416
Patented Nov. 4, 1969

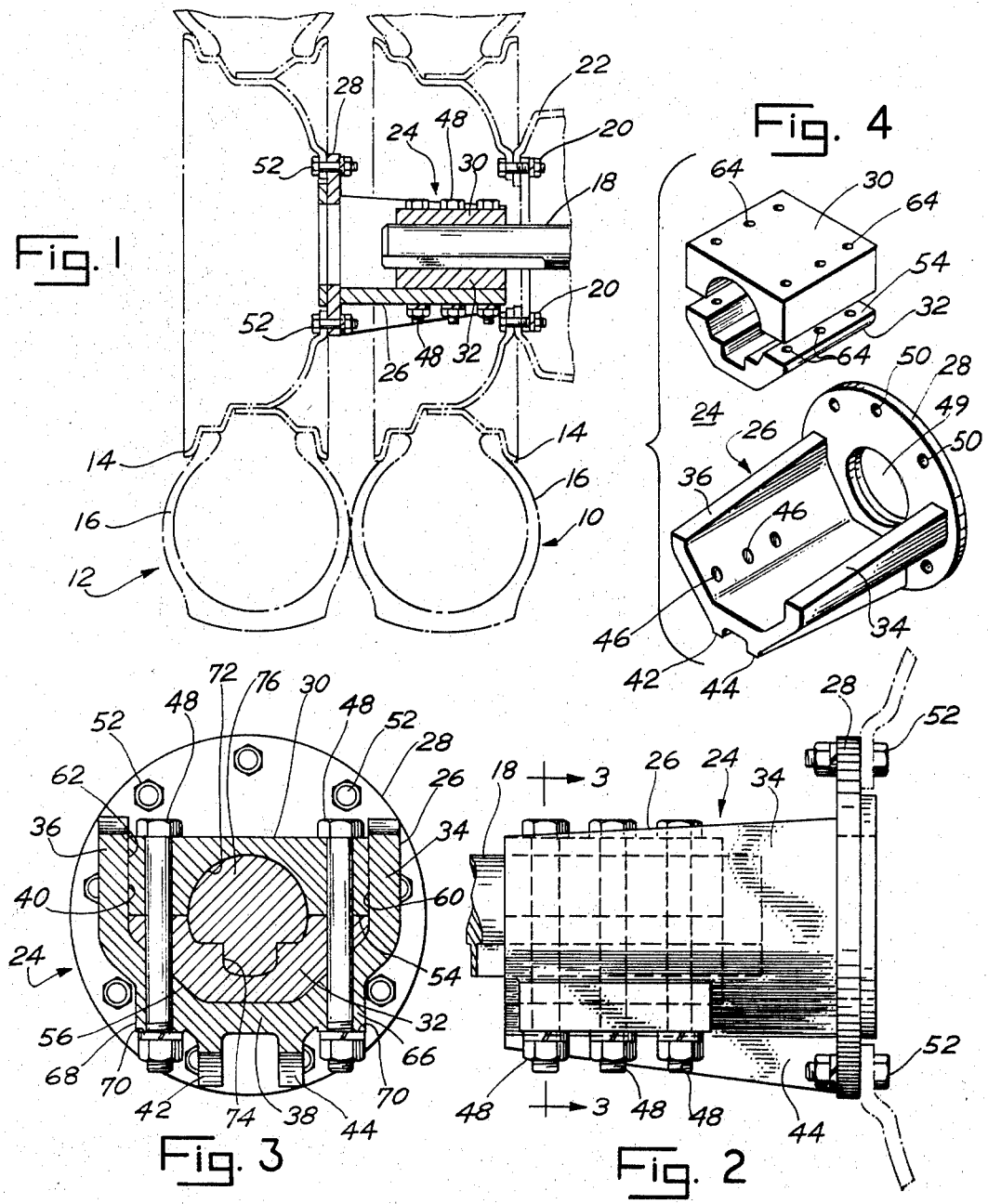

3,476,416
AXLE MOUNT
James Gilmour, Jr., Rte. 2, Aurora, Ill. 60504
Filed Jan. 20, 1967, Ser. No. 610,606
Int. Cl. B60b 27/06; F16d 1/06
U.S. Cl. 287—52.04                              7 Claims

ABSTRACT OF THE DISCLOSURE

A mount for adding an additional wheel to a tractor comprising a U-shaped hub with an integral wheel supporting end plate and a pair of interchangeable insert blocks clamped to the tractor's axle and bolted to the hub. The interchangeable insert blocks enable the hub to be mounted on axles of different diameters.

---

This invention relates, in general, to tractors and, in particular, to axle mounts for tractors for converting the drive wheels thereof, from singles to duals.

Numerous arrangements have been devised for converting a tractor's drive wheels from singles to duals, however, each of them has been generally unsatisfactory, for one reason or another. For example, many of these arrangements are so-called rim mount duals, the rims of the dual wheels being fixedly and drivingly secured to rims of the generally used wheels. Rim mount duals often place a considerable strain on the rims of both of the wheels, and particularly on the rims of the wheel to which the dual is affixed. This strain many times results in a destruction of one or both of the rims, due to warpage, breakage and the like. Many of the other arrangements have included a hub of some type which is adapted to be affixed, in most cases, with U-bolts, to the tractor's axle. These hubs are generally quite unstable and, as a result, they are subject to considerable wear and rendered useless after a relatively short period of use. Others are not versatile and cannot be used to convert to duals on different tractors having different size or shape axles.

Accordingly, it is an object of the present invention to provide improved dual axle mounts which are particularly useful in converting the drive wheels of tractors, from single wheels to dual wheels.

Another object is to provide improved dual axle mounts of the described type which are adaptable to any size and shape axle.

Still another object is to provide improved dual axle mounts of the described type which minimize the manual labor required to install and remove the dual axle mount and/or the dual wheel.

A more particular object is to provide improved dual axle mounts of the described type which include a number of insert blocks which are interchangeable to adapt the dual axle mount to any size and shape axle.

Another object is to provide improved dual axle mounts of the latter described type having straight through alignment bolts which function both to retain the insert blocks and to affix the dual axle mount to an axle so as to provide a more sturdy construction than that of a U-bolt design.

Still another object is to provide improved dual axle mounts of the described type which reduces the strain on the wheels of, for example, a tractor.

A still further object is to provide improved dual axle mounts of the described type which can be left affixed to an axle when the dual wheel is removed.

Other objects of the invention will in part be obvious and will in part appear hereinafter.

The above objectives are accomplished with a dual axle mount which includes, generally, a hub which is adapted to be affixed to the rim of a wheel and to receive a number of different insert blocks for securing it to any size or shape axle. The insert blocks are retained within the hub and the hub is affixed to an axle, by means of bolts which are extended through the insert blocks and the hub in a straight through alignment. With this construction, a versatile, sturdy dual axle mount is provided.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which:

FIG. 1 is a partial view of a set of dual wheels, sectionalized to illustrate the manner in which the dual axle mount of the present invention is affixed to an axle to convert a single wheel to a dual wheel;

FIG. 2 is a side plan view of the dual axle mount, illustrating the manner in which it is affixed to an axle and further illustrating the manner in which the rim of a wheel is affixed to it;

FIG. 3 is a sectional view taken along lines 3—3 of FIG. 2; and

FIG. 4 is an exploded perspective view of the dual axle mount.

Similar reference characters refer to similar parts throughout the several views of the drawing.

Referring now to the drawing, in FIG. 1 there is illustrated a pair of wheels 10 and 12 each including a rim 14 having a tire 16 mounted on it. The wheel 10 is drivingly affixed to an axle 18, by means of lug bolts 20 extended through apertures (not shown) in the rim 14 and a hub 22. The axle 18 and the hub 22 (both of which are partially shown) may be the axle and hub of a tractor (not shown). The wheel 12 is drivingly affixed to the axle 20, by means of the dual axle mount 24 of the present invention, which is described in detail below. A pair of the dual axle mounts 24 permit the single drive wheels normally provided on a tractor to be easily and quickly converted to duals.

More specifically, the dual axle mount 24, as can be best seen in FIGS. 2–4, includes a substantially U-shaped hub 26 having an enlarged circular-shaped end plate 28 affixed to its one end and a pair of insert blocks 30 and 32 which are adapted to be received and fixedly retained within the hub 26. The hub 26 and the end plate 28 are advantageously and preferably casted as an integral unit, however, they could be formed as separate units and fixedly secured together, by welding.

The hub 26 has a pair of arms 34 and 36 which are vertically disposed, in parallel relationship, and have lower ends which angle inwardly towards one another and are joined by a flat base 38, to form a cavity 40 for receiving the insert blocks 30 and 32. A pair of downwardly extending support ribs 42 and 44 are integrally formed with the underside of the flat base 38, to provide additional strength. The upper edges of each of the arms 34 and 36 and the lower edges of each of the support ribs 42 and 44 can be tapered, as illustrated, or simply extended outwardly substantially parallel to one another, as desired. Apertures 46 are extended through the arms 34 and 36 for receiving fastening means, such as the threaded nuts and bolts 48, used to fixedly secure the insert blocks 30 and 32 within the cavity 40.

The end plate 28 has a centrally disposed axle receiving aperture 49 and a number of radially disposed apertures 50 about its peripheral edge which are positioned to align with the apertures normally provided in a wheel rim, such as the rim 14. Lug bolts 52 are extended through the apertures 50 to removably affix a rim to the end plate 28, as illustrated in FIGS. 1 and 2.

The insert block 32, as can be best seen in FIGS. 3 and 4, has a flat top surface 54 and the exterior surface of the side wall 56 thereof is correspondingly shaped to fixedly seat within the lower portion of the cavity 40, as illustrated in FIG. 3. The insert block 30 is substantially rectangular in shape and has a flat bottom surface 58 which is adapted to seat on the flat top surface 54 of the insert block 32 and parallel side walls 60 and 62 which slidably engage the sides of the arms 34 and 36 within the cavity 40, so that the insert block 30 seats within the cavity 40 atop the insert block 32, with a snug fit. The insert blocks 30 and 32 each have a number of apertures 64 therein which are correspondingly aligned with the apertures 46 in the hub 26, for receiving the threaded nuts and bolts 48, to forcibly clamp them together, as illustrated in FIG. 3. A pair of flanges 66 and 68 are integrally formed with the arms 34 and 36 and provide flat nut-bearing surfaces 70 against which the nuts or bolts 48 can bear.

The insert blocks 30 and 32 have recessed cavities 72 and 74 formed therein, respectively, which complement one another to form an axle cavity 76 which corresponds in size and shape to the axle to which the dual axle mount 24 is to be affixed. In the illustrated embodiment, the axle 18 is substantially circular in shape, having an end portion which is formed to provide a substantially rectangular shaped key 78. The cavity 72 in the insert block 30 is substantially semi-circular in shape and has a radius which corresponds to the radius of the axle 18 so that the axle 18 fits snugly therein. The cavity 74 within the insert block 32 is correspondingly formed to matingly receive the key portion 78 of the axle 18. Accordingly, when the insert blocks 30 and 32 are fixedly clamped about the axle 18 and within the cavity 40 of the hub 26, the axle 18 is fixedly and rigidly retained therein. It has been found that this construction, and particularly the straight through alignment of the nuts and bolts 48, provides a rigid assembly which is much more sturdy and less subject to damage than the dual axle mounts presently available.

In addition to being of a far more sturdy construction, the dual axle mount 24 also is far more versatile in that it can be adapted to any size and shape axle merely by providing insert blocks which have cavities therein which complement one another to form an axle cavity corresponding to the size and shape of the particular axle to which the dual axle mount is to be affixed to convert to dual wheels. Accordingly, any tractor, or other equipment, can be easily and quickly converted using the same dual axle mount simply by inserting the appropriate insert blocks within the hub 22 thereof.

In converting a single wheel into a dual wheel, appropriate blocks 30 and 32 are loosely retained within the cavity 40 of the hub 26, and the hub 26 is affixed to the axle by sliding the axle through the axle cavity 76 formed by the cavities 72 and 74 within the respective ones of the insert blocks 30 and 32. After the hub 26 is properly positioned on the axle 18, the nuts and bolts 48 are tightened to fixedly clamp the insert blocks 30 and 32 tightly about the axle. Thereafter, the dual wheel, such as the wheel 12, is affixed to the hub 26 or, more particularly, to the end plates 28, thereof, by extending lug bolts 52 through the apertures formed within the end plate 28 and the rim 14 in the same fashion in which a wheel is normally affixed to a hub. It may be noted that the rim 14 of the dual wheel is affixed to a "hub," as opposed to the rim of the other wheel, so that there is no additional strain placed on the rim of either of the two wheels. As indicated above, the straight through alignment of the nuts and bolts 48 provide a far more sturdy construction, particularly when compared to the dual axle mounts of the type which employ U bolts. Accordingly, the hubs are far more stable and are less subject to wear and/or damage than those employing U bolts, rim mounts or similar constructions.

From the above description, it can be seen that the dual axle mount 24 and the dual wheel both can be easily and quickly affixed to a tractor's axle, to convert the drive wheels thereof to duals. Furthermore, the dual wheel can be quickly removed, in the same fashion as a wheel is generally removed, and the dual axle mount 24 can be left affixed to the axle, if desired. The same dual axle mount also can be easily and quickly adapted to fit virtually any size and shape axle, merely by providing the appropriate insert blocks.

It is also apparent in reviewing the above description that the insert block 32 can be eliminated and the lower portion of the cavity 40 correspondingly formed so that, in essence, the insert block 32 is an integral part of the hub 26. Only the insert block 30 would therefore be required. This arrangement is not as satisfactory since the dual axle mount would not be as versatile inasmuch as it could not be readily affixed to any size and shape axle. The remaining features, however, would still be available.

Now that the invention has been described, what is claimed as new and desired to be secured by Letters Patent is:

1. A dual axle mount for converting a wheel affixed to an axle to a dual wheel comprising, in combination: a hub with a substantially U-shaped cavity defined in part by a pair of axially extending upstanding arms with means at one end adapted to be affixed to the rim of a wheel; a pair of insert blocks which cooperate with said hub to adapt and to affix said dual axle mount to an axle, said insert blocks fitting between and supported against lateral movement by said hub arms, a plurality of apertures in said hub and in said insert blocks which are aligned to receive fastening means therein for affixing said insert blocks to said hub and both said hub and said insert blocks to said axle.

2. The dual axle mount of claim 1 wherein said insert blocks each has a groove formed in it, said grooves together forming an axle receiving cavity substantially corresponding to the size and shape of said axle to affix and to drivingly lock said hub and said insert block about said axle.

3. The dual axle mount of claim 1 wherein said hub and said pair of insert blocks each have a plurality of apertures therein in straight through alignment and wherein said fastening means comprise a plurality of threaded nuts and bolts which are adapted to extend through respective ones of the aligned apertures.

4. The dual axle mount of claim 1 wherein said hub is a substantially U-shaped cavity and at one end has an enlarged integral circular shaped plate with a central axle receiving aperture therein and a plurality of apertures in predetermined spaced relation radially adjacent the periphery thereof for receiving lug bolts for affixing said hub to the rim of a wheel.

5. The dual axle mount of claim 4 wherein said hub and said pair of insert blocks each have a plurality of apertures therein in straight through alignment and wherein said fastening means comprise a plurality of threaded nuts and bolts which are adapted to extend through respective ones of the aligned apertures.

6. The dual axle mount of claim 5 wherein one of said pair of insert blocks is formed to seat in the lower portion of said U-shaped cavity and the other one of said pair of insert blocks is formed to seat atop said first insert block and be laterally supported within the upstanding arms of said U-shaped cavity, whereby both of said insert blocks are lockingly retained therein.

7. The dual axle mount of claim 1 including a plurality of pairs of insert blocks, each pair having grooves therein which are complementary and cooperate with one another to form an axle receiving cavity of a predetermined size and shape, whereby said dual axle mount can be affixed to any size and shape axle by affixing an appropriate pair of insert blocks within said hub.

References Cited

UNITED STATES PATENTS

| | | | |
|---|---|---|---|
| 770,501 | 9/1904 | Kottusch | 287—52.03 |
| 2,507,093 | 5/1950 | Collings | 287—52 |
| 2,655,410 | 10/1953 | Brown | 301—1 |
| 2,819,117 | 1/1958 | Glazier | 301—1 |
| 3,084,000 | 4/1963 | Dubberke | 301—1 |

FOREIGN PATENTS 120,460  5/1901  Germany.

CARL W. TOMLIN, Primary Examiner

A. V. KUNDRAT, Assistant Examiner

U.S. Cl. X.R.

301—1